United States Patent
Harrington et al.

(10) Patent No.: US 12,462,725 B2
(45) Date of Patent: Nov. 4, 2025

(54) ELECTRO-OPTIC DISPLAYS AND METHODS FOR DRIVING THE SAME

(71) Applicant: E INK CORPORATION, Billerica, MA (US)

(72) Inventors: Demetrious Mark Harrington, Cambridge, MA (US); Kenneth R. Crounse, Somerville, MA (US); Karl Raymond Amundson, Cambridge, MA (US); Teck Ping Sim, Acton, MA (US); Matthew J. Aprea, Wellesley, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/029,235

(22) Filed: Jan. 17, 2025

(65) Prior Publication Data

US 2025/0201163 A1    Jun. 19, 2025

Related U.S. Application Data

(60) Continuation of application No. 18/510,185, filed on Nov. 15, 2023, which is a continuation of application
(Continued)

(51) Int. Cl.
    *G09G 3/20*     (2006.01)
    *G09G 3/34*     (2006.01)
(52) U.S. Cl.
    CPC .......... *G09G 3/2007* (2013.01); *G09G 3/344* (2013.01); *G09G 2230/00* (2013.01); *G09G 2340/16* (2013.01)

(58) Field of Classification Search
    CPC .... G09G 3/2007; G09G 3/344; G09G 3/3446; G09G 5/06; G09G 2320/0285;
    (Continued)

(56) References Cited

U.S. PATENT DOCUMENTS

| 4,418,346 A | 11/1983 | Batchelder |
| 5,760,761 A | 6/1998 | Sheridon |

(Continued)

OTHER PUBLICATIONS

Wood, D., "An Electrochromic Renaissance?" Information Display, 18(3), Mar. 24, 2002.
(Continued)

*Primary Examiner* — Amr A Awad
*Assistant Examiner* — Aaron Midkiff
(74) *Attorney, Agent, or Firm* — Jason P. Colangelo

(57) ABSTRACT

An electro-optic display having a plurality of pixels is driven from a first image to a second image using a first drive scheme, and then from the second image to a third image using a second drive scheme different from the first drive scheme and having at least one impulse differential gray level having an impulse potential different from the corresponding gray level in the first drive scheme. Each pixel which is in an impulse differential gray level in the second image is driven from the second image to the third image using a modified version of the second drive scheme which reduces its impulse differential The subsequent transition from the third image to a fourth image is also conducted using the modified second drive scheme but after a limited number of transitions using the modified second drive scheme, all subsequent transitions are conducted using the unmodified second drive scheme.

20 Claims, 10 Drawing Sheets

Driving the display from a first image to a second image using a first driving scheme Driving the display from the second image to a third image using a second drive scheme, for pixels with an impulse differential gray level, use a modified version of the first drive scheme

Related U.S. Application Data

No. 18/050,769, filed on Oct. 28, 2022, now Pat. No. 11,854,456, which is a continuation of application No. 17/386,982, filed on Jul. 28, 2021, now Pat. No. 11,545,065, which is a continuation of application No. 15/632,730, filed on Jun. 26, 2017, now Pat. No. 11,145,235, which is a division of application No. 14/190,135, filed on Feb. 26, 2014, now Pat. No. 9,721,495.

(60) Provisional application No. 61/769,802, filed on Feb. 27, 2013.

(58) Field of Classification Search
CPC ............ G09G 2340/16; G09G 2230/00; G02F 1/161–169
See application file for complete search history.

(56) References Cited

U.S. PATENT DOCUMENTS

| | | | |
|---|---|---|---|
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,836,809 B2 | 12/2004 | Bace |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,091,944 B2 | 8/2006 | Wang |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,193,625 B2 | 3/2007 | Danner et al. |
| 7,197,582 B2 | 3/2007 | Chelcea et al. |
| 7,202,847 B2 | 4/2007 | Gates |
| 7,236,291 B2 | 6/2007 | Kaga et al. |
| 7,259,744 B2 | 8/2007 | Arango et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,814 B2 | 3/2010 | Paolini, Jr. et al. |
| 7,804,483 B2 | 9/2010 | Zhou et al. |
| 7,839,564 B2 | 11/2010 | Whitesides et al. |
| 7,952,557 B2 | 5/2011 | Amundson |
| 7,956,841 B2 | 6/2011 | Albert et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,237,733 B2 | 8/2012 | Rhodes |
| 8,259,123 B2 | 9/2012 | Funakubo |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,319,759 B2 | 11/2012 | Jacobson et al. |
| 8,355,018 B2 | 1/2013 | Rhodes et al. |
| 8,384,658 B2 | 2/2013 | Albert et al. |
| 8,558,783 B2 | 10/2013 | Wilcox et al. |
| 8,723,889 B2 | 5/2014 | Wang |
| 8,842,139 B2 | 9/2014 | Kanamori |
| 8,922,475 B2 | 12/2014 | Yamada |
| 8,928,562 B2 | 1/2015 | Gates et al. |
| 9,230,492 B2 | 1/2016 | Harrington et al. |
| 9,672,766 B2 | 6/2017 | Sjodin |
| 9,726,957 B2 | 8/2017 | Telfer et al. |
| 10,319,313 B2 | 6/2019 | Harris et al. |
| 10,372,008 B2 | 8/2019 | Telfer et al. |
| 2003/0102858 A1 | 6/2003 | Jacobson et al. |
| 2005/0253777 A1 | 11/2005 | Zehner et al. |
| 2007/0103427 A1 | 5/2007 | Zhou et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0150928 A1 | 6/2008 | Van Der Hoef et al. |
| 2010/0265561 A1 | 10/2010 | Gates et al. |
| 2011/0285754 A1* | 11/2011 | Harrington ............ G09G 3/344 345/690 |
| 2012/0098873 A1* | 4/2012 | Kanamori ............ G09G 3/2011 345/690 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, "International Search Report and Written Opinion", PCT/US2014/018899, Jul. 17, 2014.

* cited by examiner

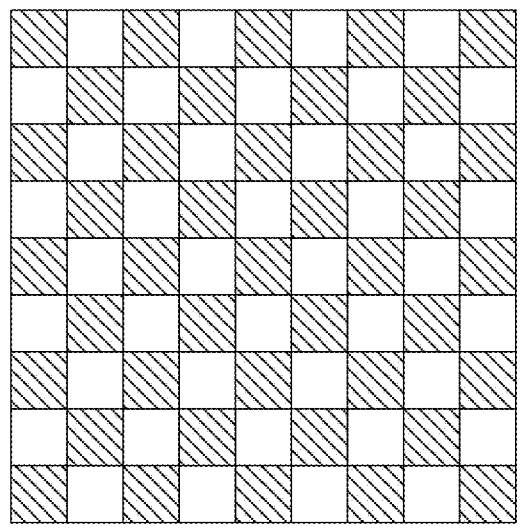
Fig. 3A
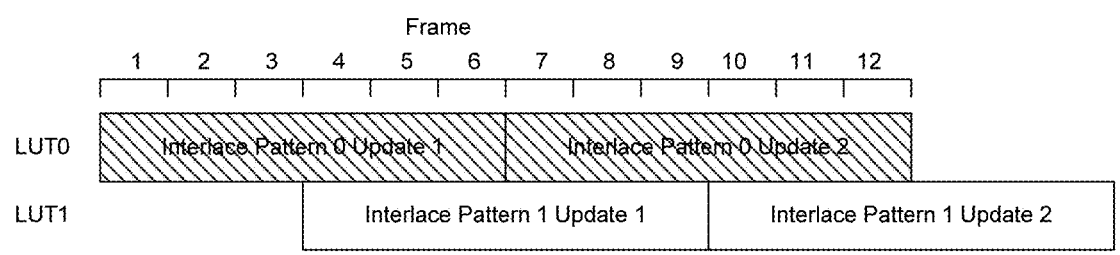
Fig. 3B
Fig. 3C

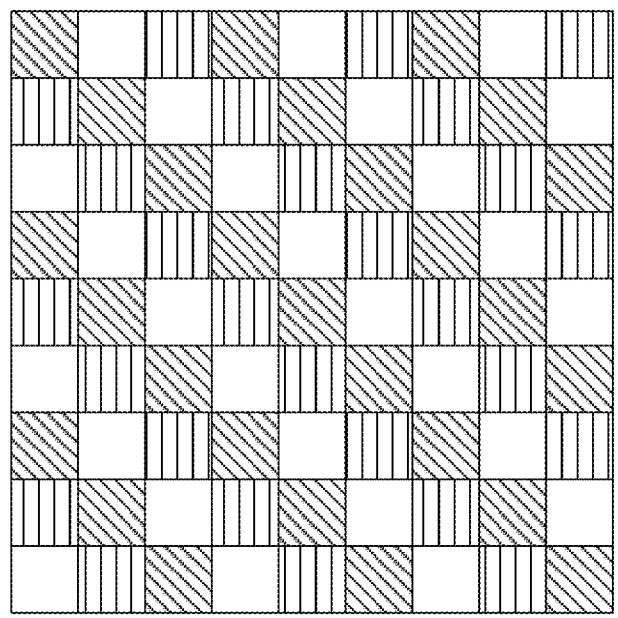
Fig. 4A
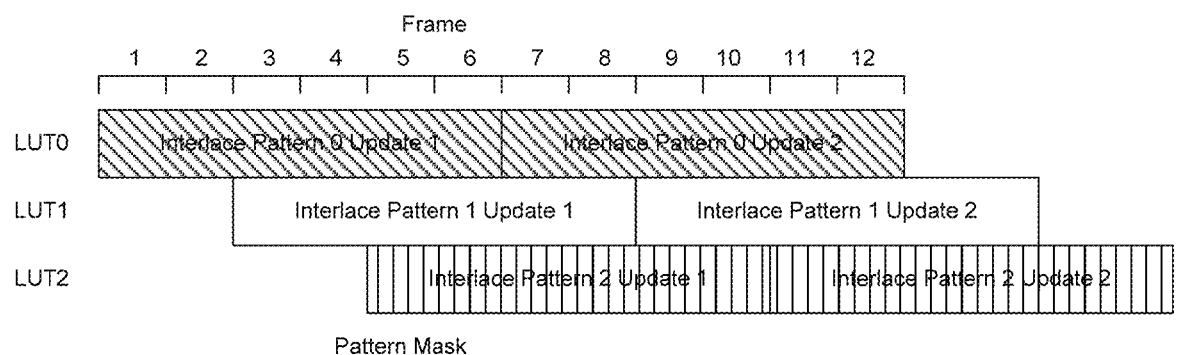
Fig. 4B
Fig. 4C

ELECTRO-OPTIC DISPLAYS AND METHODS FOR DRIVING THE SAME

CROSS-REFERENCE TO RELATED APPLICATIONS

This application is a continuation application of U.S. patent application Ser. No. 18/510,185 filed on Nov. 15, 2023, which is a continuation application of U.S. patent application Ser. No. 18/050,769 filed on Oct. 28, 2022, which is a continuation application of U.S. patent application Ser. No. 17/386,982 filed on Jul. 28, 2021, which is a continuation application of U.S. patent application Ser. No. 15/632,730 filed on Jun. 26, 2017, now issued as U.S. Pat. No. 11,145,235, which is a divisional application of U.S. patent application Ser. No. 14/190,135 filed on Feb. 26, 2014, now issued as U.S. Pat. No. 9,721,495. The Ser. No. 14/190,135 application claims the benefit of U.S. provisional Patent Application Ser. No. 61/769,802, filed Feb. 27, 2013.

This application is related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754; and copending application Ser. No. 14/152,067, filed Jan. 10, 2014.

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications mentioned below, are hereby incorporated by reference herein.

BACKGROUND OF INVENTION

The present invention relates to methods for driving electro-optic displays, especially bistable electro-optic displays, and to apparatus for use in such methods. More specifically, this invention relates to driving methods which may allow for rapid updates of the display, including the display of video material (which for present purposes may be defined as material which requires the updating of the display at a rate of at least about 10 frames per second, and typically more often). This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,982,178; and 7,839,564;
(d) Backplanes, adhesive layers and other auxiliary layers and methods used in displays; see for example U.S. Pat. Nos. 7,116,318; and 7,535,624;
(e) Color formation and color adjustment; see for example U.S. Pat. No. 7,075,502; and U.S. Patent Application Publication No. 2007/0109219;
(f) Methods for driving displays; see the aforementioned MEDEOD applications;
(g) Applications of displays; see for example U.S. Pat. Nos. 7,312,784; and 8,009,348; and
(h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.
(d) Humidity Dependence; The impulse required to switch a pixel to a new optical state depends, with at least some types of electro-optic media, on the ambient humidity.
(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.
(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R_0)^{1/3} - 16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Also, as discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called "heterogeneous loops" involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. However, it is often desired to make use of two different drive schemes in the same display; for example, displays used as electronic book readers may use a relatively slow gray scale drive scheme to render high quality page images, and a more rapid drive scheme which produces lower quality images for page flipping, animation and user interface elements such as menus. When two different drive schemes are employed in this manner, the impulse potentials of the various optical states common to two different drive schemes are not necessarily the same, even though the optical states themselves are the same in the two drive schemes. Accordingly, when a pixel or group of pixels are shifted from one drive scheme to another, it is necessary to compensate for any differences in impulse potentials between the optical states of the two drive schemes, since if this is not done, repeated switching between the two drive schemes may cause accumulation of DC imbalance and consequent damage to the display. As described in several of the aforementioned MEDEOD applications, it has hitherto been the practice to employ a special "transition" drive scheme (which may involve the use of a standard "transition" image, typically one in which all the pixels are turned white or black simultaneously) to compensate for the differences in impulse potentials; such transition drive schemes effect immediate compensation for the differences in impulse potentials in a single transition, but are significantly longer than the rapid drive scheme may have unwanted visual effects, such as the repeated appearance of the standard transition image, which appears as a white or black flash to the user.

In one aspect, the present invention relates to methods for driving electro-optic displays using multiple drive schemes which allow for DC imbalance compensation during transitions between the drive schemes but which avoid the aforementioned disadvantages of prior art transition drive schemes.

Another aspect of this invention relates to methods for driving electro-optic displays to allow for playing of video. As discussed in some of the aforementioned MEDEOD applications, many bistable electro-optic displays have difficulty playing video because of the relatively long drive schemes involved, even though it can be shown that video perceived as high quality by a user can be displayed on many bistable electro-optic displays using lower frame rates than are needed on, for example, cathode ray tube or liquid crystal displays. It has been found that the rendering of video on bistable electro-optic displays can be improved by taking advantage of the fact that in playing video the sequence of images is known far in advance.

Finally, this invention relates to display controllers with enhanced video capabilities for carrying out the methods of the present invention.

SUMMARY OF INVENTION

Accordingly, in one aspect, this invention provides a first method of driving an electro-optic display having a plurality of pixels. This method comprises driving the display from a first image to a second image using a first drive scheme, and thereafter driving the display from the second image to a third image using a second drive scheme different from the first drive scheme and having at least one gray level (hereinafter an "impulse differential" gray level) having an impulse potential different from the corresponding gray level in the first drive scheme. Each pixel which is in an impulse differential gray level in the second image is driven from the second image to the third image using a modified version of the second drive scheme such that the modified version reduces the impulse differential introduced by switching from the first drive scheme to the second drive scheme. For pixels having at least one impulse differential gray level in the second image, the subsequent transition from the third image to a fourth image is also conducted using the modified second drive scheme. After a limited number of transitions using the modified second drive scheme, all subsequent transitions are conducted using the unmodified second drive scheme.

This first driving method of the present invention may hereinafter for convenience be referred to as the "temporarily modified second drive scheme" or "TMSDS" method of the invention.

In another aspect, this invention provides a second method of driving an electro-optic display having a plurality of pixels. This method comprises driving from a first image to a second image using a first drive scheme, and thereafter driving the display from the second image to a third image using a second drive scheme different from the first drive scheme and having at least one gray level (hereinafter an "impulse differential" gray level) having an impulse potential different from the corresponding gray level in the first drive scheme. Prior to driving the display from the second image to the third image, a transition waveform is applied to pixels having at least one but less than all of the gray levels in the second image. After this application of the transition waveform, transition waveforms are applied to individual pixels only when those pixels are undergoing a change in gray level. In a preferred form of this method, the transition waveform is initially applied only to pixels in and remaining in, a single gray level, preferably one extreme gray level, and most desirably the white state of the display. In another preferred form of this method, after the initial application of the transition waveforms, transition waveforms are not applied to individual pixels undergoing certain gray level transitions. After any given pixel has a transition waveform applied thereto, subsequent transitions of that pixel are effected using the second drive scheme.

This second driving method of the present invention may hereinafter for convenience be referred to as the "delayed transition waveform drive scheme" or "DTWDS" method of the invention.

This invention also provides a third method of driving a bistable electro-optic display having a plurality of pixels. This third method comprises:
   storing data representing at least an initial state of each pixel of the display;
   receiving input signals representing first and second desired gray levels of at least one pixel of the display, the first desired gray level to be displayed before the second desired gray level; and
   storing a look-up table containing data representing the impulses necessary to convert an initial gray level to a first desired gray level and thence to a second desired gray level;
   determining from the stored data representing the initial state, the input signals and the look-up table, the impulses necessary to convert the initial gray level to the first desired gray level and thence to the second desired gray level; and
   generating at least one output signal representing at least one pixel voltage to be applied to said one pixel.

This third driving method of the present invention may hereinafter for convenience be referred to as the "multiple future state drive scheme" or "MFSDS" method of the invention. It will be appreciated that this method may take account of more than two desired gray levels, although since each additional desired gray level increases the size of the lookup table by a factor equal to the number of gray levels (subject of course to the various techniques for lookup table compression discussed in the aforementioned MEDEOD applications), it will typically not be desirable to take account of more than about three or four desired gray levels.

The present invention also provides novel display controllers arranged to carry out the methods of the present invention.

In all the methods of the present invention, the display may make use of any of the type of electro-optic media discussed above. Thus, for example, the electro-optic display may comprise a rotating bichromal member or electrochromic material. Alternatively, the electro-optic display may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

BRIEF DESCRIPTION OF THE DRAWINGS

FIG. 3A illustrates the arrangement of the two groups of pixels used in a two-region interlaced display described in Part D below.

FIG. 3B is a schematic timing diagram showing the manner in which the regions shown in FIG. 3A are updated.

FIG. 3C shows the pattern mask corresponding to the regions shown in FIG. 3A.

FIGS. 4A-4C are diagrams similar to those of FIGS. 3A-3C respectively, but illustrate a three-region interlaced display described in Part D below.

DETAILED DESCRIPTION

Figure 1:
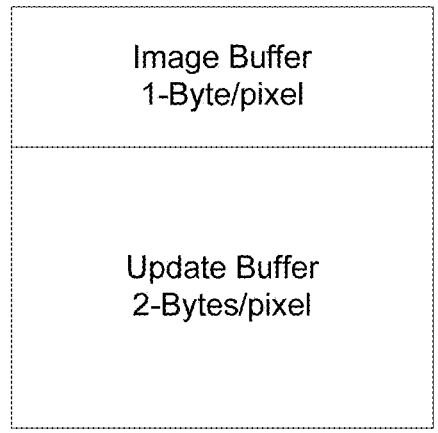
FIG. 1 is a schematic diagram showing the memory arrangement in a typical prior art controller for a bistable electro-optic display, as described in Part D below.

It will be apparent from the foregoing that the present invention provides a plurality of discrete inventions relating to driving electro-optic displays and apparatus for use in such methods. These various inventions will be described separately below, but it will be appreciated that a single display may incorporate more than one of these inventions. For example, it will readily be apparent that a single display could make use of the delayed transition waveform drive scheme of the present invention when displaying static images and make use of the multiple future state drive scheme when displaying video.

Part A: Temporarily Modified Second Drive Scheme Method of the Invention

As explained above, the temporarily modified second drive scheme (TMSDS) method of the invention is intended for use in an electro-optic display having a plurality of pixels. The method drives a display from a first image to a second image using a first drive scheme, and thereafter drives the display from the second image using a second drive scheme different from the first drive scheme; the display will then typically proceed to display a series of successive images using the second drive scheme before transitioning back to the first drive scheme, or possibly transitioning to a third drive scheme different from both the first and second drive schemes. For example, in a display used as an electronic book reader, the first drive scheme may be a relatively slow gray scale drive scheme to render high quality page images, and the second drive scheme may be a more rapid drive scheme which produces lower quality images for page flipping, animation and user interface elements such as menus. At least one gray level in the second drive scheme has a different impulse potential different from the corresponding gray level in the first drive scheme; the gray levels in which the impulse potentials differ between the two drive schemes are referred to as "impulse differential gray levels". Instead of attempting to eliminate the impulse differentials between the two drive schemes in a single operation using a transition drive scheme as in the prior art, the TMSDS eliminates the impulse differentials in a stepwise (or incremental) manner by using a modified version of the second drive scheme to eliminate the impulse differential during the first few transitions following the switch from the first to the second drive scheme. Such temporary modification of the second drive scheme depending upon the original impulse differential at each pixel when the second image is displayed (i.e., at the switchover from the first to the second drive scheme) allows the transition from the first to the second drive scheme to be made with very little performance change and without the objectionable flashing common in prior art methods for switching drive schemes.

The prior art method of compensating for impulse differentials between drive schemes may be represented symbolically as follows:

$$DS1 \rightarrow TDS \rightarrow DS2 \qquad (1)$$

where DS1 and DS2 are two different drive schemes, and TDS is a transition drive scheme which is applied only during the transition from DS1 to DS2 and serves to eliminate the impulse differentials between the various gray levels of DS1 and DS2. (If DS1 and DS2 have different numbers of gray levels, TDS may also serve to transition pixels having gray levels in DS1 which do not exist in DS2 to the appropriate gray level in DS2.) This arrangement of drive schemes compensates for all the impulse differentials at once, effectively resetting the differentials in one transition handled by TDS. In contrast, in the TMSDS of the present invention, DS2 is temporarily modified so that at least a part of any impulse differential existing on a specific pixel at the time of the shift from DS1 to DS2 is compensated each time a DS2 transition is effected, until the entire impulse differential has been eliminated. Thus, the TMSDS of the present invention may be represented symbolically as follows:

$$DS1 \to (DS2 \pm 1)_n \to DS2 \qquad (2)$$

where DS2±1 represents a drive scheme which is a modified version of DS2 but in which the impulse of each waveform is altered by a single unit, and the sub-script "n" represents an integral number of repetitions of the DS2±1 drive scheme depending upon the impulse differential which must be eliminated at a specific pixel. It will be appreciated that, unless the impulse differentials are all of the same sign (which is unlikely, although see Part B below regarding the possibility of changing all the impulse differentials by a constant), the TMSDS method of the present invention actually requires two modified versions of the second drive scheme, which may be represented as DS2±1 and DS2−1 respectively, depending upon the sign of the impulse differential to be eliminated. It is also necessary to track, in either hardware or software, the value of "n" for each pixel; alternatively, one can track the gray levels of each pixel, which will itself control the value of "n" for each pixel.

More complicated versions of the TMSDS may also be used. For example, if the impulse differentials are large and/or very accurate adjustment is desirable, two modified versions of the second drive scheme may be used with one effecting a larger change in the impulse differential than the other. For example, one may have one modified drive scheme which adjusts the impulse differential by a single unit at each transition, while the other modified drive scheme adjusts the impulse differential by two units at each transition. These two modified drive schemes may be schematically represented by DS2±1 and DS2+2 respectively (with, of course the corresponding provision of DS2−1 and DS2−2 drive schemes. A transition requiring a correction of five units of impulse differential could then be symbolically represented as:

$$DS1 \to DS2 + 2 \to DS2 + 2 \to DS2 + 1 \to DS2 \qquad (3)$$

More generally, one could use several different modified second drive schemes having differing correction of impulse differential, producing transitions of the form:

$$DS1 \to DS2 \pm n_1 \to DS2 \pm n_2 \to DS2 \pm n_3 \to DS2 \qquad (4)$$

where $n_1$, $n_2$ and $n_3$ are different amounts of impulse differential correction, and are not necessarily integers. Note that in such a sequence not all of the impulse differential corrections need be of the same sign; if, for example, $n_1$:$n_2$:$n_3$::1:2:5, it might be convenient to effect a correction of +4 units by applying a +5 unit correction followed by a −1 unit correction. It will be appreciated that, depending upon the exact correction of impulse differential needed for a particular gray level, pixels in different gray levels at the time of the switch from the first drive scheme may start at different points the transition sequence or may make use of only a subset of the steps.

The TMSDS method of the present invention may require a minimum number of transitions be effected using the second drive scheme before the display switches back to the first drive scheme (or to a third drive scheme) in order to ensure that the impulse voltage correction is completed before the next change of drive scheme occurs. Alternatively, shortened adjustment sequences or shortened modified second drive scheme waveforms could be used to reduce the time needed for impulse differential correction. Alternatively, if a controller is used which keeps a running total of the impulse differential for each pixel, any impulse differential remaining when the display switches back to the first drive scheme (or to a third drive scheme) can simply be used to adjust the impulse differential needed for the later change of drive scheme.

The TMSDS method of the present invention may be used for all transitions between differing drive schemes in a display, or the TMSDS method may be used for some transitions and prior art impulse differential correction methods used for other transitions. At least in some cases, it may be possible to use the TMSDS method for impulse differential correction when switching in one direction between two drive schemes and leave the switching in the other direction temporarily uncompensated. For example, consider the display described above which is used as an electronic book reader with a relatively slow gray scale drive scheme to render high quality page images, and a more rapid drive scheme which produces lower quality images for page flipping, animation and user interface elements such as menus. Since the more rapid drive scheme will typically only be used for brief periods (and DC imbalance can typically be tolerated for brief periods without risk of damage to the display) and since the human eye tends to less critical of minor image rendering errors when seeing rapidly changing images such as page flipping or animation than when seeing static images such as electronic book pages, the switch from the gray scale drive scheme to the more rapid drive scheme could be left temporarily uncompensated (i.e., in the nomenclature used above, there would be a direct switch from DS1 to DS2 with no intervening use of DS2±1). However, the display controller would track the impulse differentials introduced by this change of drive scheme. When the display is switched back to the gray scale drive scheme, the TMSDS method is used to correct for impulse differentials, but the differentials thus corrected are the sum of those introduced in the two switches of drive scheme.

In the TMSDS method of the present invention, instead of the whole waveform having one offset waveform, there could be a matrix that determines the imbalance offset dependent on transition. For example, a 1→3 transition may have a +2 but a 2→4 transition may have a +4. Having different offsets would require a waveform that has an offset of 1 or one that has an offset in the opposite direction such that one could apply the +balance and −balance waveforms until they cancel each other out then the normal waveform would be applied. The TMSDS method could be applied to the whole display but could best operate on the pixel by pixel level.

In certain situations where a display can "know" in advance that a switch of drive schemes will be needed (for example, where the display is playing an animation from within an electronic book using a rapid drive scheme, and at the end of the animation the display will revert to a slow gray scale drive scheme to re-display the page of the electronic book from which the animation is taken), a modified form of the TMSDS method may be used in which a modified form of the first rather than the second drive scheme may be used for impulse differential correction. Thus, the impulse differential correction is effected during the last few transitions of the first drive scheme preceding the switch of drive schemes, rather than during the first few transitions using the second drive scheme. Such a modified TMSDS method may be symbolically represented by:

$$DS1 \rightarrow DS1 \pm n_1 \rightarrow DS1 \pm n_2 \rightarrow DS1 \pm n_3 \rightarrow DS2 \qquad (5)$$

where n1, n2 and n3 have the same meanings as in (4) above.

From the foregoing, it will be seen that the TMSDS method of the present invention allows for rapid transitions between different drive schemes without the visual artifacts or flashes common in prior art methods.

Part B: Delayed Transition Waveform Drive Scheme Method of the Invention

As explained above, the delayed transition waveform drive scheme or DTWDS method of the invention is a second method for switching an electro-optic display having a plurality of pixels between two drive schemes with proper correction of impulse differentials but without the visual artifacts or flashes common in prior art methods. The DTWDS method comprises driving the display from a first image to a second image using a first drive scheme, and thereafter driving the display from the second image to a third image using a second drive scheme different from the first drive scheme and having at least one gray level (hereinafter an "impulse differential" gray level) having an impulse potential different from the corresponding gray level in the first drive scheme. Prior to driving the display from the second image to the third image, a transition waveform is applied to pixels having at least one but less than all of the gray levels in the second image. After this application of the transition waveform, transition waveforms are applied to individual pixels only when those pixels are undergoing a change in gray level.

It will be seen that the TMSDS and DTWDS methods of the present invention can be regarded as two implementations of a common basic idea, namely avoiding the application of a special transition drive to a large number of pixels at the same time. In the TMSDS method, a "transition drive scheme" (the modified second drive scheme) is applied simultaneously to all the pixels which require impulse differential correction, but the amount of impulse differential correction effected during any one transition is limited, and not all pixels undergoing impulse differential correction will finish such correction as the same time. In effect, the impulse differential correction is temporally dispersed. In the DTWDS method, the impulse differential correction is areally dispersed, in that only a small proportion of the pixels undergo visible impulse differential correction at any one time, so that any visual effects from such correction are less visible than if all pixels underwent such correction at the same time.

In a preferred form of the DTWDS method, the first and second drive schemes have the same waveform (hereinafter referred to as "the common waveform") for at least one transition. Typically, this is a zero transition (i.e., one in which the optical state of the pixel does not change) involving pixels in one of the extreme optical states of the display, most commonly the extreme white state. For example, consider the display described above which is used as an electronic book reader with a relatively slow gray scale drive scheme to render high quality page images, and a more rapid drive scheme which produces lower quality images for page flipping, animation and user interface elements such as menus. Commonly, in both the gray scale and the rapid drive scheme, a zero waveform having no voltage pulses is applied to pixels undergoing a white-to-white transition. (Slow fading of the white state is dealt with by a separate overall refresh drive scheme applied only at relatively long intervals of time or after a large number of transitions, as described in the aforementioned MEDEOD applications.) Even if a white-to-white transition does require the application of a non-zero waveform having voltage pulses, this non-zero waveform can be made very short, shorter than the length of the rapid drive scheme, typically be eliminating periods of zero voltage from the white-to-white waveform used in one of the first and second drive schemes, leaving perhaps just a small number of voltage pulses to correct the white state. In the preferred DTWDS method of the present invention, only white-to-white transitions are effected in the first transition following the switch from the first to the second drive scheme. Depending upon the display controller used, this white-to-white only "drive scheme" may require its own lookup table. If the common waveform is a zero waveform, the length of this notional first transition can be made zero, so that all the pixels which were white at the end of the last transition using the first drive scheme can be regarded as immediately having undergone impulse differential correction, without the provision of any additional lookup table in the display controller. Typically a large proportion of pixels are subject to the common waveform, and thus undergo immediate impulse differential correction.

Pixels which are not subject to the common waveform (typically. pixels which are not in a white state after the last transition using the first drive scheme) undergo impulse differential correction only when the optical state of the pixel changes (i.e., when the pixel undergoes a non-zero transition), and impulse differential correction is not necessarily effected on the first non-zero transition undergone by such pixels. Obviously, impulse differential correction is effected by modifying the second drive scheme waveforms used for the transition at which the correction is effected. The decision as to whether to effect impulse differential correction during a specific transition at a specific pixel can be made in either hardware or software, and explicitly or by algorithm. For example, if a specific pixel needs an impulse differential correction which (were it to be applied on its own) would represent a white-going pulse, it will generally be easier to effect the necessary correction during a transition which ends in the white extreme optical state, since an additional white-going pulse added to the transition waveform simply drives the pixel into the white "optical rail" (as that term is used in the aforementioned MEDEOD applications) and has essentially no effect on the final optical state. Conversely, if a specific pixel needs an impulse differential correction which represents a black-going pulse, the necessary correction may be effected during a transition which ends in the dark extreme optical state, since an additional black-going pulse added to the transition waveform simply drives the pixel into the black optical rail. However, it is not necessary to wait for a pixel to undergo a transition which ends in an extreme optical state. In many drive schemes, at least some intermediate gray level-to-intermediate gray level transitions use waveforms which "bounce the pixel off at least one optical rail", i.e., the transitions use waveforms which drive the pixel from the original intermediate gray level to one extreme optical state, then back to the final intermediate gray level, or in some cases drive the pixel from the original intermediate gray level to one extreme optical state, back to the other extreme optical state and then to the final intermediate gray level; see, for example, U.S. Pat. No. 7,012,600, FIGS. 11A and 11B, and the related description. With such "rail-bounce" waveforms additional white-going or black-going drive pulses can be introduced while the pixel is in the corresponding extreme optical state with essential no effect on the final gray level of the pixel following the transition.

For example, in one specific display of the type discussed above having a 16 gray level slow gray scale first drive scheme and a rapid second drive scheme, it was found to be unwise to effect impulse differential correction from the four darkest gray levels of the first drive scheme to the darkest state of the second drive scheme, but to make the necessary correction on transitions where the final state was the white state of the second drive scheme.

The DTWDS of the present invention requires the tracking, by hardware or software, of which individual pixels of the display have and have not undergone impulse differential correction. Once a pixel has undergone such correction, obviously any further transitions are effected using the unmodified second drive scheme.

As with the TMSDS method of the present invention, the DTWDS may be used for all transitions between differing drive schemes in a display, or the DTWDS method may be used for some transitions and prior art impulse differential correction methods used for other transitions. At least in some cases, it may be possible to use the DTWDS method for impulse differential correction when switching in one direction between two drive schemes and leave the switching in the other direction temporarily uncompensated. In certain situations where a display can "know" in advance that a switch of drive schemes will be needed, a modified form of the DTWDS method may be used in which a modified form of the first rather than the second drive scheme may be used for impulse differential correction, although note in this case that the common transition pixels would be the last pixels to undergo correction, which might render this "inverted DTWDS" method less acceptable.

The DTWDS method of the present invention has advantages similar to those of the TMSDS method, and is especially useful in situations (common in electronic book readers and similar devices where the images displayed often comprise, in whole or in large part, black text on a white background—such images typically have 90% or more white pixels) where the major part of the pixels are in the state associated with the common transition, and/or only a minor proportion of pixels are undated at each transition Part C: Multiple Future State Drive Scheme Method of the Invention As discussed the "multiple future state drive scheme" or "MFSDS" method of the invention is a third method for driving a bistable electro-optic display having a plurality of pixels. This third method comprises storing data representing at least an initial state of each pixel of the display; receiving input signals representing first and second desired gray levels of at least one pixel of the display, the first desired gray level to be displayed before the second desired gray level; and storing a look-up table containing data representing the impulses necessary to convert an initial gray level to a first desired gray level and thence to a second desired gray level; determining from the stored data representing the initial state, the input signals and the look-up table, the impulses necessary to convert an initial gray level to a first desired gray level and thence to a second desired gray level; and generating at least one output signal representing at least pixel voltage to be applied to said one pixel.

As discussed for example in the aforementioned 2008/0291129, many bistable electro-optic media have difficulty displaying video, which requires fast updates of a display at 10 frames per second or more, whereas bistable electro-optic media often require waveforms having a duration of 200 millisecond or more. It has now been realized that significant advantages can be achieved in video drive schemes for electro-optic displays by taking advantage of the fact that when playing videos a whole series of successive images are defined in advance; this is in contrast to the situation typically encountered in displaying static images, such as the successive pages of an electronic book, where one does not know in advance which the next image will be, since although it is likely that the user will choose to display the next page of the electronic book, the user might also choose to refer back to a previous page, look up a word using the electronic dictionary with which many electronic book readers are provided, go to the table of contents of the book etc.

It has now been realized that the problems associated with displaying the rapid succession of images needed for video can be reduced by adopting a waveform dependent not only upon the initial and final states of a pixel for a particular transition, but also the desired state of the pixel after at least one further transition (and possible more later transitions). The computational details of the waveforms required for such multi-transition drive schemes, including the problems of increasing lookup table size as the number of transitions considered are increased, and methods for reducing lookup table size, are similar to those involved in prior art drive scheme which take account not only of the initial and final states of a pixel for a particular transition, but also at least one prior state of the pixel preceding the initial state, as set forth in several of the aforementioned MEDEOD applications, including U.S. Pat. Nos. 7,012,600 and 7,119,772. The MFSDS method does have the considerable advantage that DC balance need only be considered with regard to the final state reached by the series of transitions.

For example, an MFSDS method of the present invention might define a two transition 1→3→4 waveform, which would start in optical state 1, around the halfway point in the waveform reach optical state 3 and end in optical state 4. The intermediate optical state 3 would, in this case, not require DC balancing because any DC imbalance would be taken care of by the time it reached the final optical state 4. Another example would be a three transition 1→3→3→3 waveform. This would start in optical state 1, and transition to the optical state 3. It would have two more time intervals to slightly adjust both the optical appearance and the DC balance to best match optical state 3.

The waveforms used in the MFSDS method of the present invention require that the pixel be reasonably close to the intermediate desired states at the intermediate times in the overall waveform or assume the intermediate desired states within a predetermined tolerance interval of the appropriate intermediate time. Alternatively, some other algorithm could be used taking into account the eye's response in order to decide what variation of optical state against time can be tolerated in an MFSDS drive scheme. The tolerable variations could be dependent on the transition. For example, in a two transition drive scheme, 1→3→3 waveform might be required to have a tighter optical variation response on the final level 3 state than a 1→4→3 waveform since there is a lot more natural movement from gray level 4 to gray level 3 than in the zero transition from gray level 3 to gray level 3 in the former waveform.

The MFSDS drive scheme of the present invention can be practiced with prior art controllers, but can be more readily implemented using controllers of the present invention, as discussed in Part D below. The MFSDS drive scheme offers the prospect of providing greatly improved display updates with reduction in the number of mediocre updates, as compared with prior art video display methods, and could be very powerful if combined with display interlacing. The MFSDS drive scheme also allows for better tuning of the drive scheme.

Part D: Controller Architecture

As indicated above, a further aspect of the present invention relates to improved display controller architecture, especially in controllers intended for displaying video. The architecture of prior art controllers is not optimized for displaying video, thus leaving much of the difficult work of rendering video to be effected in software on the host controller which supplies video data to the display controller. The present invention provides an improved display controller architecture that allows a cleaner implementation of video on a controller for a bistable electro-optic display.

In a typical prior art controller for bistable displays, for example electrophoretic displays, the frame buffer memory is divided into two regions, an image buffer region and an update buffer region, as illustrated in FIG. 1 of the accompanying drawings. The image buffer region is the region into which the host controller loads a new image to appear on the display, while the update buffer region is a working region of memory that contains the current/next pixel Look Up Table (LUT) index values.

Figure 2:
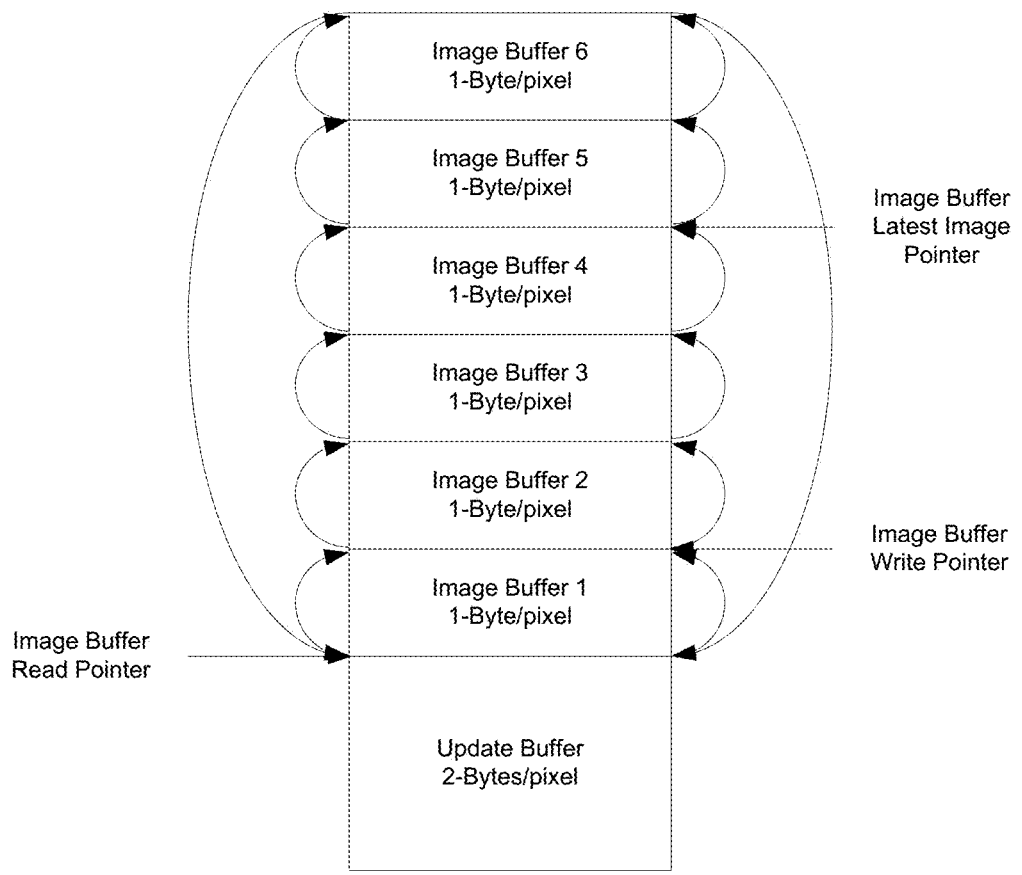
FIG. 2 is a schematic diagram, similar to that of FIG. 1, showing the memory arrangement in an improved controller of the present invention.

FIG. 2 of the accompanying drawings is a schematic diagram, similar to that of FIG. 1, of the memory structure of an improved display controller of the present invention. The memory structure of FIG. 2 provides a rotating set of image buffer regions which allow the host controller to write images to the frame buffer at any arbitrary video frame rate (as fast as the host controller can decode the video frames), and the display controller may retrieve and update the display with the latest whole video frame image written by the host controller. As in a typical computer first in first out (FIFO) memory arrangement, the display controller and the host controller are advised of the current state of the memory structure by a set of semaphores comprising an Image Buffer Read Pointer, an Image Buffer Write Pointer, an Image Buffer Empty Flag, and a Programmable Image Buffer Nearly Empty Flag. In contrast to a standard FIFO memory arrangement, there is no Image Buffer Full Flag, and instead there is an Image Buffer Latest Image Pointer, which marks the location of the last complete video frame image written to the memory by the host controller. The image buffer never gets full, since the host controller can always simply overwrite image buffer slots (that are not currently in use by the display controller), and update the Image Buffer Latest Image Pointer. In this way the display controller can also keep time with the video frame rate (introducing some video frame rate jitter in the process).

To allow for smoother image-to-image transitions on a bistable electro-optic display, it may be desirable for the display to be partitioned into interlaced regions (a term which is used herein the mean that the various pixels of the display are divided into separate groups, and does not imply that the various groups represent differing lines of the display, as is common on analog television broadcasts), and to use the partial update feature (standard in current state of the art display controllers, as described in several of the aforementioned MEDEOD applications) to update each region at a time offset from the other regions. An example of a two-region grid is shown in FIGS. 3A and 3C of the accompanying drawings, and a three-region grid is shown in FIGS. 4A and 4C. The offset updating of the two displays will readily be apparent to those skilled in the art from FIGS. 3B and 4B respectively.

Figure 5:
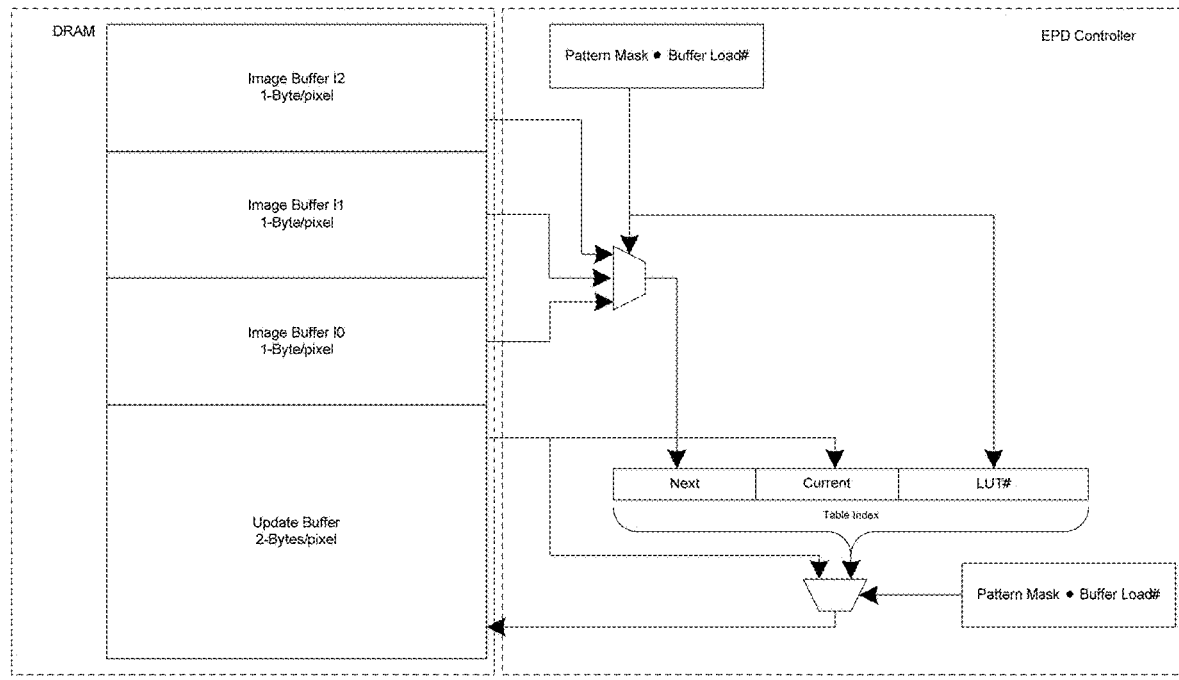
FIG. 5 is a schematic block diagram of a display controller of the present invention which incorporates the memory architecture shown in FIG. 2 and which can be used to carry out the interlaced display updating methods shown in FIGS. 3B and 4B.

The pattern masks shown in FIGS. 3C and 4C can be used in a novel controller architecture of the present invention (see FIG. 5) in conjunction with the memory structure shown in FIG. 2 to facilitate a flexible video capable display controller that uses the pattern mask information to select the pixels included in the interlacing pattern currently initiating an update, where the image buffers can be stored in a dynamic random-access memory (DRAM). These pixels are then updated in a partial update fashion starting at a point in time where adjacent pixels (members of a different interlacing pattern) are concurrently being updated.

Figure 6A:
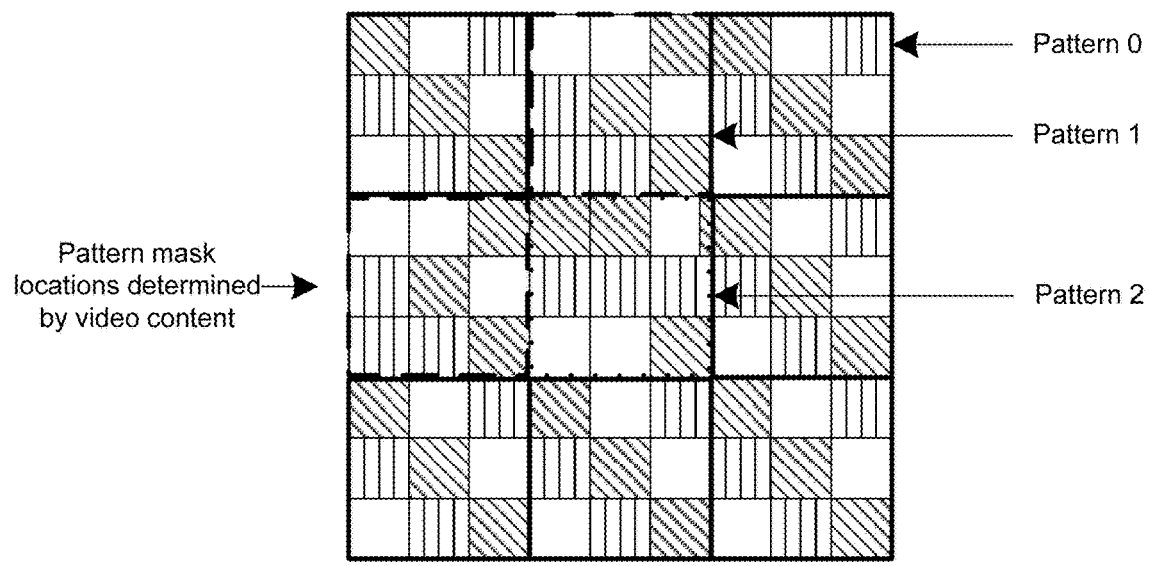
FIGS. 6A-6C are diagrams similar to those of FIGS. 3A-3C and 4A-4C respectively, but illustrate a flexible interlaced display in which the regions change dynamically.
Figure 6B:
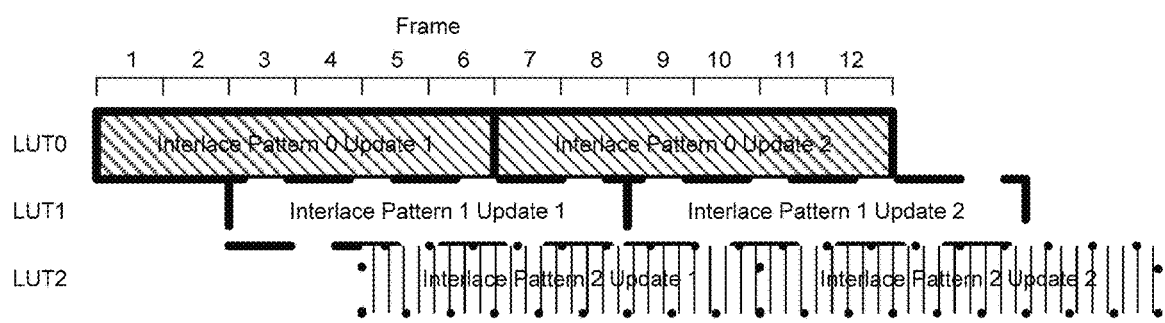
Figure 6C:
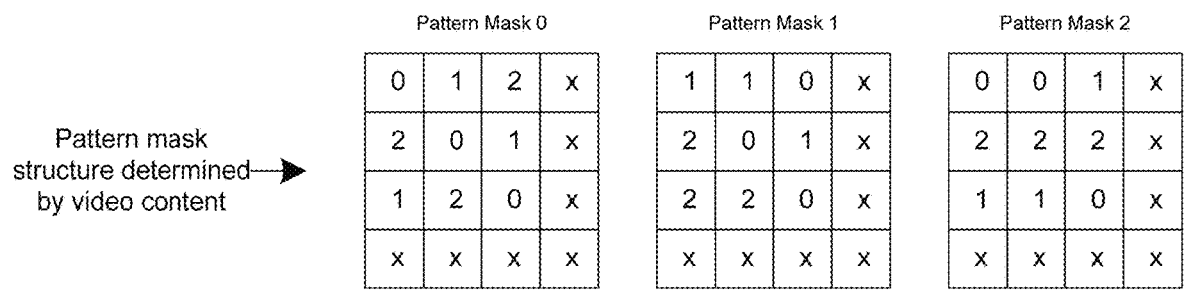

The display controllers of the present invention can also make use of flexible interlacing techniques, as illustrated in FIGS. 6A-6C. For systems that are dynamic and contain time and spatially varying content, it may be desirable to allow the interlacing patterns used by the display controller to be flexible with respect to the area of the display in which they are employed and the time during which interlacing pattern-locations are applied. FIGS. 6A-6C depict three possible interlacing patterns that may be chosen, and the locations of each, while FIG. 7 shows a controller architecture which may be used to carry out the flexible interlacing method of FIGS. 6A-6C.

Figure 7:
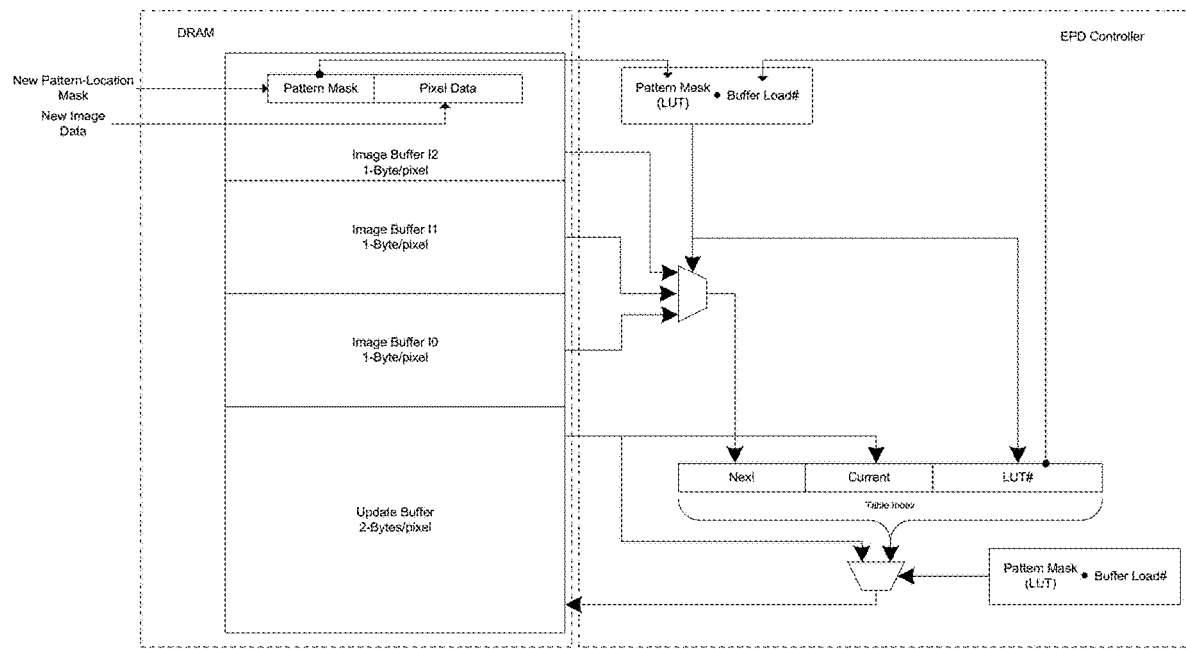
FIG. 7 is a schematic block diagram, similar to that of FIG. 5, of a display controller of the present invention which can be used to carry out the flexible interlacing method shown in FIGS. 6A-6C.

FIG. 7 illustrates a display controller architecture which can be used to carry out the flexible interlacing method shown in FIGS. 6A-6C, where the image buffers can be stored in a dynamic random-access memory (DRAM). For every new pattern mask-location scheme the host controller determines the optimum set of pattern masks, and the positions of these masks upon the image surface; alternatively, this information may be encoded within the video or other content to be displayed. The pattern masks once laid out upon the display surface dictate which lookup table will be used to update each pixel. This information may be communicated to the display controller by means of 2-4 bits in the image buffer memory. For the first image in each pattern-location set, the display controller uses the pattern mask indicator stored in the image buffer to select the lookup table for that pixel. Subsequent image updates in the current pattern-location set will not alter the lookup table numbers in the update buffer, only the next and current pixel bits may be altered, and then only if currently selected by the lookup table number, which acts as a proxy for the pattern mask. During prolonged periods of video playback or dynamic image updates as dictated by user input, it may be desirable to alter the pattern-location set. To implement such a change it is necessary to halt image updates by completing the latest commanded update and then to load a new pattern-location mask set and to begin image updates in the same manner as described above.

Figure 8:
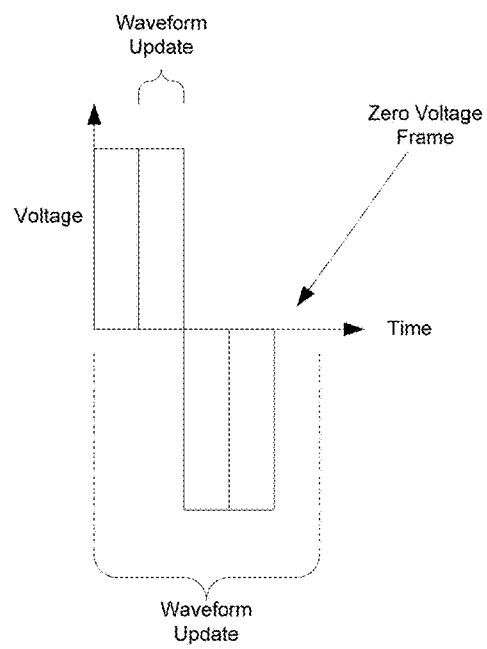
FIG. 8 is a voltage versus time curve for a prior art waveform which terminates with a period of zero voltage.
Figure 9:
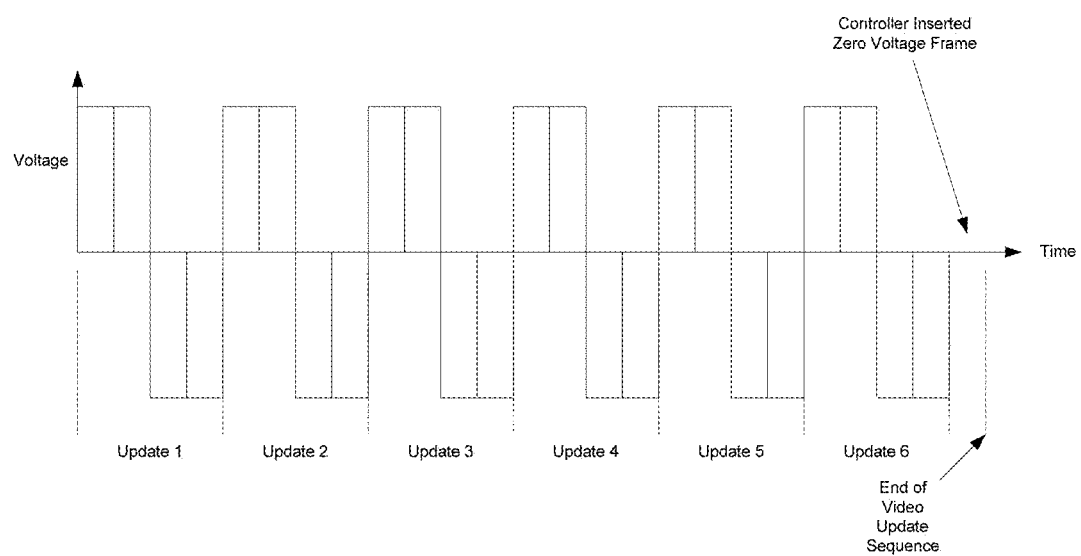
FIG. 9 is a voltage versus time curve, similar to that of FIG. 8, but showing a waveform produced by a display controller of the present invention which can insert a period of zero voltage at the end of a string of video updates.
Figure 10A:
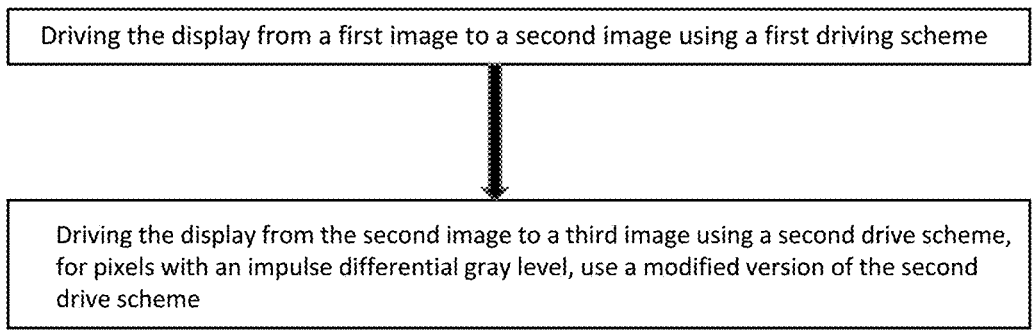
FIGS. 10A-10C are flow charts illustrating driving methods in accordance with the subject matter disclosed herein.
Figure 10B:
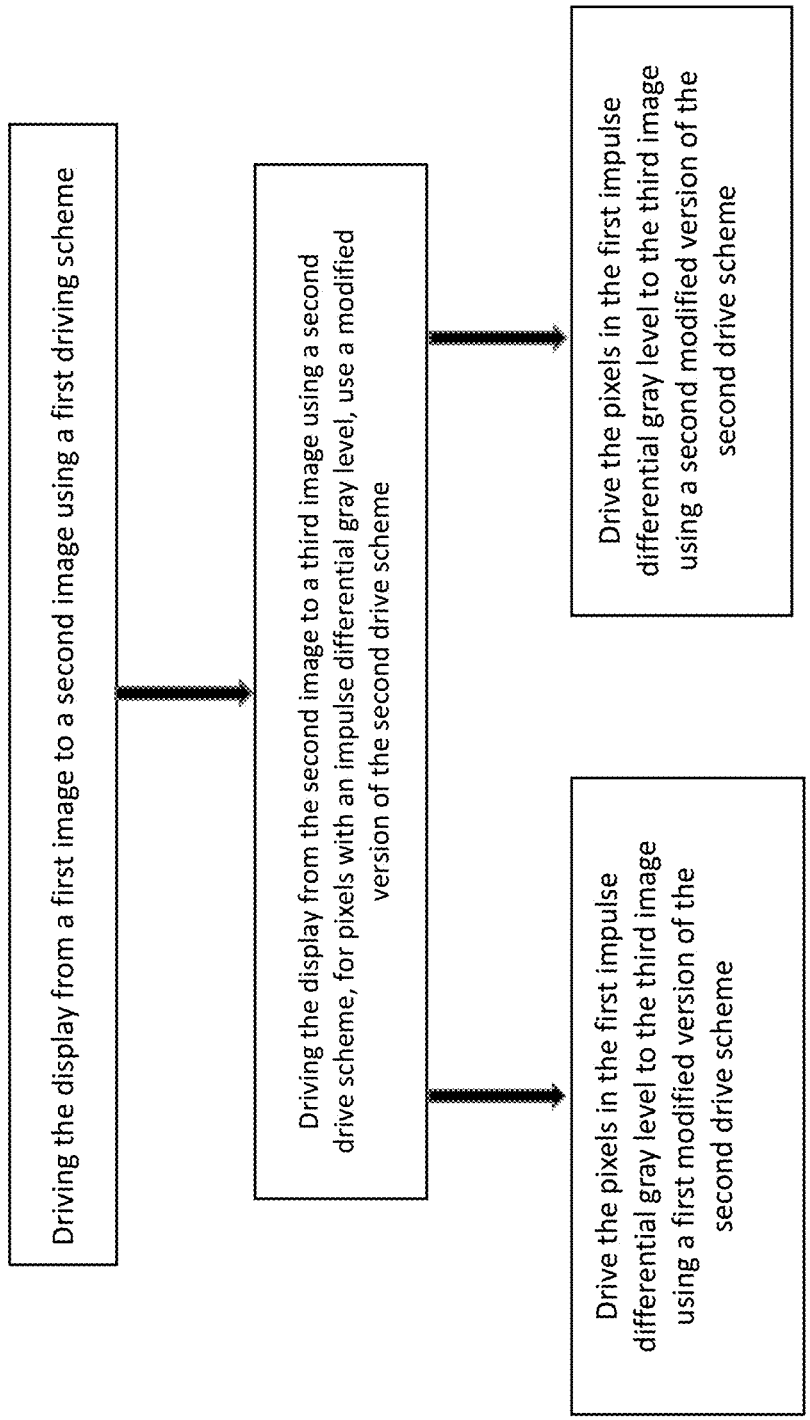
Figure 10C:
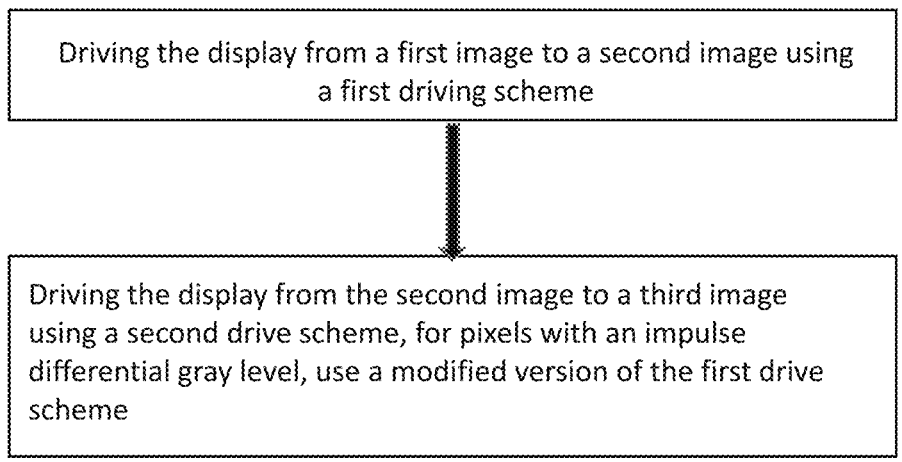

The present invention also provides a display controller which is capable of detecting the end of a series of video updates and inserting a period of zero voltage at the end of the series of updates. As discussed in the aforementioned MEDEOD applications, most active matrix bistable displays have backplanes incorporating a storage capacitor associated with each pixel electrode; these capacitors assist in maintaining the driving voltage on the associated pixel electrode during periods when the relevant row of pixels are not selected during scanning of the active matrix display, and when the pixel electrodes are thus not connected to the column electrodes. When the image on the display is to remain the same for some period (as for example, when the display has been updated to display a page of an electronic book, and the user may need perhaps 30 seconds to read the page), it is highly desirable that the voltages on the storage capacitors be set to zero so that residual voltages on the capacitors do not cause additional driving of the pixels and thus changes in the image displayed. To ensure that the voltages on the storage capacitors are set to zero at the end of each update, it is conventional practice to provide a period of zero voltage at the end of each waveform used to effect the update. Conventionally, the period of zero voltage is "hard wired" into each waveform, i.e., each waveform terminates with one or more frames of zero voltage, as illustrated in FIG. 8. The provision of such hard wired periods of zero voltage is useful in waveforms intended to effect discrete updates at widely spaced intervals (as when a user requires display of successive pages of an electronic book), since discharging the capacitors at the end of each update is necessary whenever a static image is to remain on the display for any length of time. However, the provision of such hard wired periods of zero voltage is unnecessary when video is being displayed, since there is no significant period when a static image is displayed, and undesirable both because the period of zero voltage lengthens the waveform (thus exacerbating the problem of relatively slow response by bistable electro-optic media already discussed) and because it may waste energy (because the period of zero voltage may result in discharging a capacitor when then has to immediately recharged to the same polarity in the next transition). Accordingly, it is desirable to eliminate the periods of zero voltage when a waveform is to be used for a transition which is to be immediately followed by a further transition, but to keep the period of zero voltage in the final transition of a series, after which a static image is to be displayed for a substantial period. This is effected, as illustrated in FIG. 9, by providing waveforms which lack the final period of zero voltage and arranging for the display controller to determine when a series of transitions terminates, whereupon the display controller adds a period of zero voltage to the final waveform.

From the foregoing description, it will be seen that the present invention provides display controllers with improved video performance with electrophoretic and other bistable displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of driving an electro-optic display having a plurality of pixels, the method comprising:
 driving the electro-optic display from a first image to a second image using at least one gray level transition of a first drive scheme, and
 thereafter driving the electro-optic display from the second image to a third image using at least one gray level transition of a second drive scheme different from the first drive scheme,
 the second drive scheme having at least one impulse differential gray level having an impulse potential difference with respect to a corresponding gray level in the first drive scheme, and wherein
 each one of the plurality of pixels that will be in the at least one impulse differential gray level in the second image is driven from the first image to the second image using a modified version of the first drive scheme such that
 the modified version of the first drive scheme reduces the impulse potential difference introduced in each one of the plurality of pixels that will be in the at least one impulse differential gray level in the second image by switching from the first drive scheme to the second drive scheme, and wherein,
 for each one of the plurality of pixels that will be in the at least one impulse differential gray level in the second image,
 at least a last two gray level transitions prior to the second image are conducted using the modified version of the first drive scheme.

2. The method of claim 1 wherein gray level transitions of the modified first drive scheme depend upon the impulse potential difference introduced in each one of the plurality of pixels that will be in the at least one impulse differential gray level in the second image by switching from the first drive scheme to the second drive scheme when the second image is displayed.

3. The method of claim 1 wherein an impulse potential difference of each gray level transition in the modified version of the first drive scheme differs from an impulse potential difference of a same gray level transition in the first drive scheme by one unit.

4. The method of claim 1 wherein the first image, second image, and third image are successive images in a video or animation.

5. The method of claim 1 wherein a difference between an impulse potential difference of a gray level transition in the modified version of the first drive scheme and an impulse potential difference of a same gray level transition in the first drive scheme varies depending upon the gray level transition.

6. The method of claim 1 wherein the electro-optic display comprises a rotating bichromal member, electrochromic or electro-wetting material.

7. The method of claim 1 wherein the electro-optic display comprises an electrophoretic material comprising a plurality of electrically charged particles disposed in a fluid and capable of moving through the fluid under an influence of an electric field.

8. The method of claim 7 wherein the plurality of electrically charged particles and the fluid are confined within a plurality of capsules or microcells.

9. The method of claim 7 wherein the plurality of electrically charged particles and the fluid are present as a plurality of discrete droplets surrounded by a continuous phase comprising a polymeric material.

10. The method of claim 7 wherein the fluid is gaseous.

11. A method of driving an electro-optic display having a plurality of pixels, the method comprising:
 driving the electro-optic display from a first image to a second image using at least one gray level transition of a rapid drive scheme, wherein
 the first image and the second image are successive images in a video or animation; and
 thereafter driving the electro-optic display from the second image to a third image using at least one gray level transition of a slow gray scale drive scheme different from the rapid drive scheme,
 the slow gray scale drive scheme having at least one impulse differential gray level having an impulse potential difference with respect to a corresponding gray level in the rapid drive scheme, wherein
 the second image and the third image are successive images in the video or animation, wherein
 the third image is a last image in the video or animation, and wherein
 for each one of the plurality of pixels that will be in the at least one impulse differential gray level in the third image, at least a last two gray level transitions prior to the third image are conducted using a modified version of the rapid drive scheme such that the modified version of the rapid drive scheme reduces the impulse potential difference introduced in each one of the plurality of pixels that will be in the at least one impulse differential gray level in the third image by switching from the rapid drive scheme to the slow gray scale drive scheme.

12. The method of claim 11 wherein gray level transitions of the modified version of the rapid drive scheme depend upon the impulse potential difference introduced in each one of the plurality of pixels that will be in the at least one impulse differential gray level in the third image by switching from the rapid drive scheme to the slow drive scheme when the third image is displayed.

13. The method of claim 11 wherein an impulse potential difference of each gray level transition in the modified version of the rapid drive scheme differs from an impulse potential difference of a same gray level transition in the rapid drive scheme by one unit.

14. The method of claim 11 wherein a difference between an impulse potential difference of a gray level transition in the modified version of the rapid drive scheme and an impulse potential difference of a same gray level transition in the rapid drive scheme varies depending upon the gray level transition.

15. The method of claim 11 wherein the electro-optic display comprises a rotating bichromal member, electrochromic or electro-wetting material.

16. The method of claim 11 wherein the electro-optic display comprises an electrophoretic material comprising a plurality of electrically charged particles disposed in a fluid and capable of moving through the fluid under an influence of an electric field.

17. The method of claim 16 wherein the plurality of electrically charged particles and the fluid are confined within a plurality of capsules or microcells.

18. The method of claim 16 wherein the plurality of electrically charged particles and the fluid are present as a plurality of discrete droplets surrounded by a continuous phase comprising a polymeric material.

19. The method of claim 16 wherein the fluid is gaseous.

20. The method of claim 11 wherein impulse potential differences of a gray level transition in the modified version of the rapid drive scheme are not DC balanced and impulse potential differences of a same gray level transition in the slow gray scale drive scheme are DC balanced.

\* \* \* \* \*